Oct. 21, 1941.   J. S. CLAPPER   2,259,553
MOWER
Filed April 2, 1938   4 Sheets-Sheet 1

Inventor
JOHN S. CLAPPER
By Paul, Paul Moore
ATTORNEYS

Oct. 21, 1941.  J. S. CLAPPER  2,259,553
MOWER
Filed April 2, 1938  4 Sheets-Sheet 2
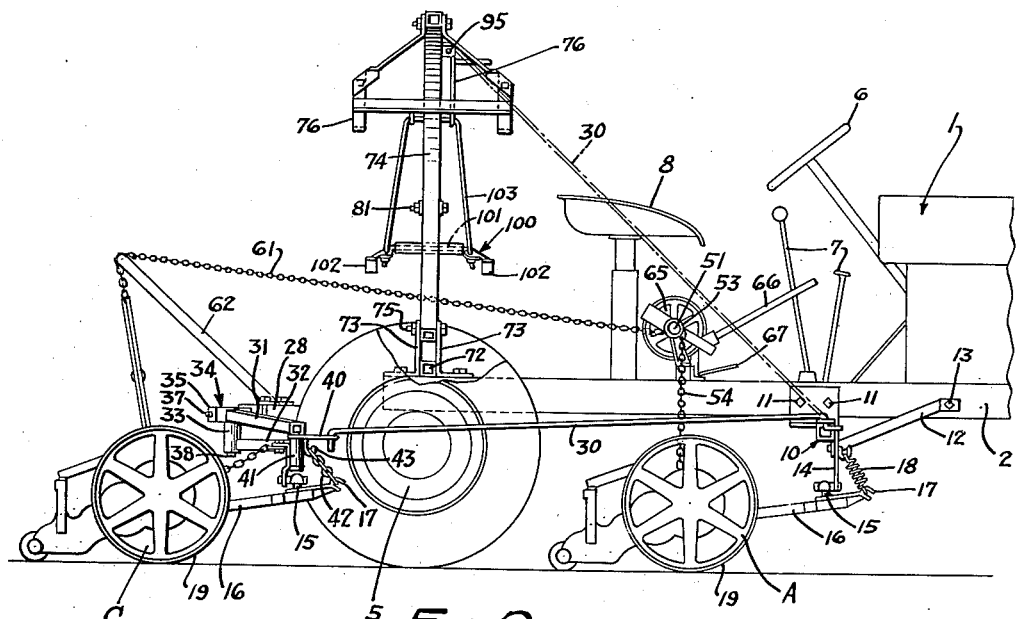
Fig. 2
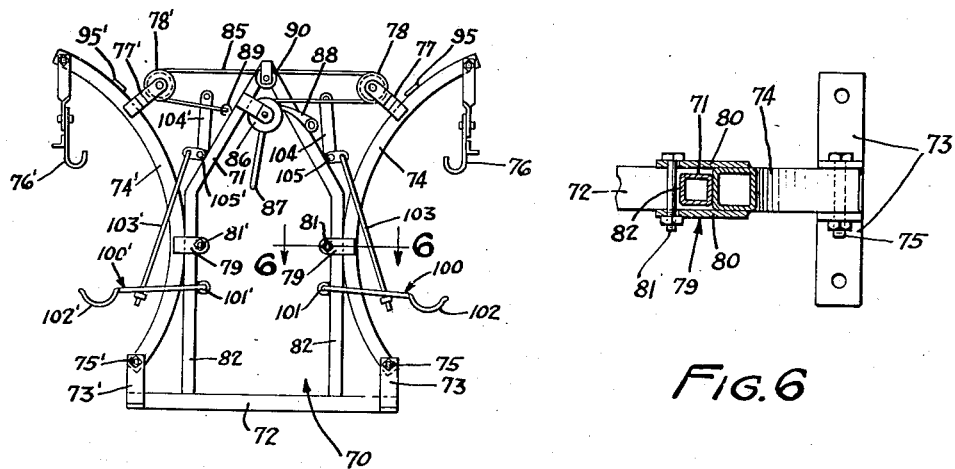
Fig. 5
Fig. 6
Inventor
JOHN S. CLAPPER
By Paul, Paul Moore
ATTORNEYS Oct. 21, 1941.  J. S. CLAPPER  2,259,553
MOWER
Filed April 2, 1938  4 Sheets-Sheet 3

Inventor
JOHN S. CLAPPER
By Paul, Paul Moore
ATTORNEYS

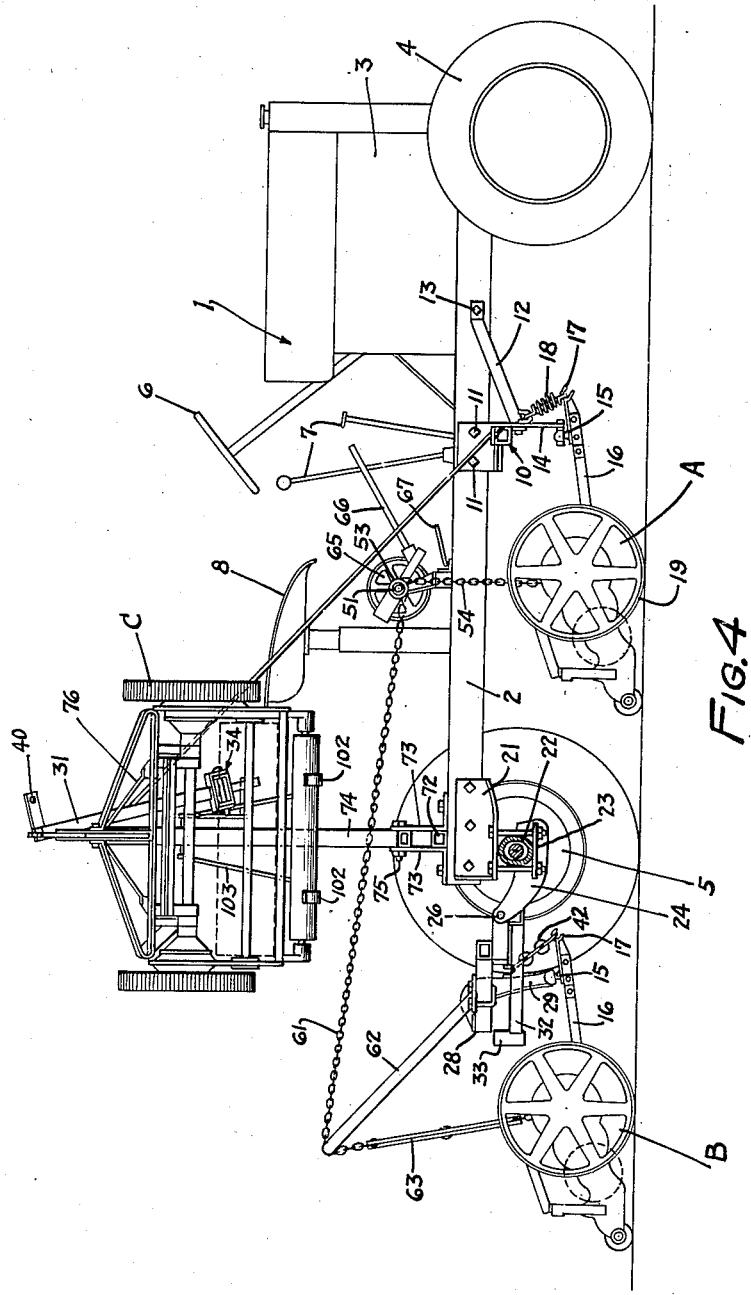

Patented Oct. 21, 1941

2,259,553

UNITED STATES PATENT OFFICE 2,259,553

MOWER

John S. Clapper, Minneapolis, Minn., assignor to Toro Manufacturing Corporation of Minnesota, Minneapolis, Minn., a corporation of Minnesota Application April 2, 1938, Serial No. 199,665

7 Claims. (Cl. 56—7)

The present invention relates to a multiple unit lawn mowing machine of the type in which a plurality of lawn mowing units are arranged to spaced relation about a propelling vehicle, and particularly to an arrangement and mechanism for hoisting all of said cutting units from the ground and into carrying positions on the vehicle.

The propelling vehicle of such a multiple unit mowing machine serves both as a tractor for drawing the units at a suitably slow speed for mowing a lawn, and as a transporting vehicle for moving the units from one lawn or park area to another. When serving in the latter capacity it is desirable for high speed transport to have the weight of the units distributed so that the center of gravity of the load will be between the axles of the vehicle. It is, therefore, an object of the present invention to provide a hoisting and stowing arrangement by which such a result may be accomplished.

It is also an object of the present invention to provide a hoist and stowing mechanism which will function to reduce the overall width of the machine when the mowing units are in transporting position so as to facilitate movement along streets and in traffic. For this purpose, as well as for mowing, low pressure pneumatic tires are desirable, as set forth in the co-pending application, Serial Number 676,086, which illustrates a tractor type gang mower in which the traction vehicle is equipped with low-pressure tires so as to provide good traction when the vehicle is used over irregular surfaces.

It is a further object of the invention to provide a hoisting and stowing mechanism which will hold the mowing units steadily against displacement while the vehicle is moving rapidly, or while moving over rough terrain.

The mowing units of a multiple unit mowing machine, when located behind the propelling vehicle, present a considerable mass which produces a substantial overturning moment when the units are hoisted each in rear position onto the vehicle. It is an object of the invention to provide a hoisting and stowing mechanism which operates to hoist the units onto the vehicle in positions where no such moment will be produced.

It is also an object of the present invention to provide a hoisting and stowing mechanism by which one man may safely raise or lower one after another of the mowing units by a continuous movement of the hoisting control mechanism.

Other objects and features of the invention are those inherent and suggested by the drawings, and those inherent and suggested by the embodiments of the invention described hereinafter.

In the description hereinafter given, reference is had to the accompanying drawings in which like characters represent corresponding parts in all views, and in which Figure 1 is a plan view showing the mowing machine units positioned about the propelling vehicle.

Figure 2 is a side elevation of the mowing machine including only part of the propelling vehicle.

Figure 4 is a side elevation partly in section, along the line 4—4 of Figure 3, showing one of the units in hoisted and stowed position.

Figure 5 is a detail of the novel hoisting and stowing mechanism.

Figure 6 is a detailed view in section along the lines 6—6 of Figure 5.

Figure 1:
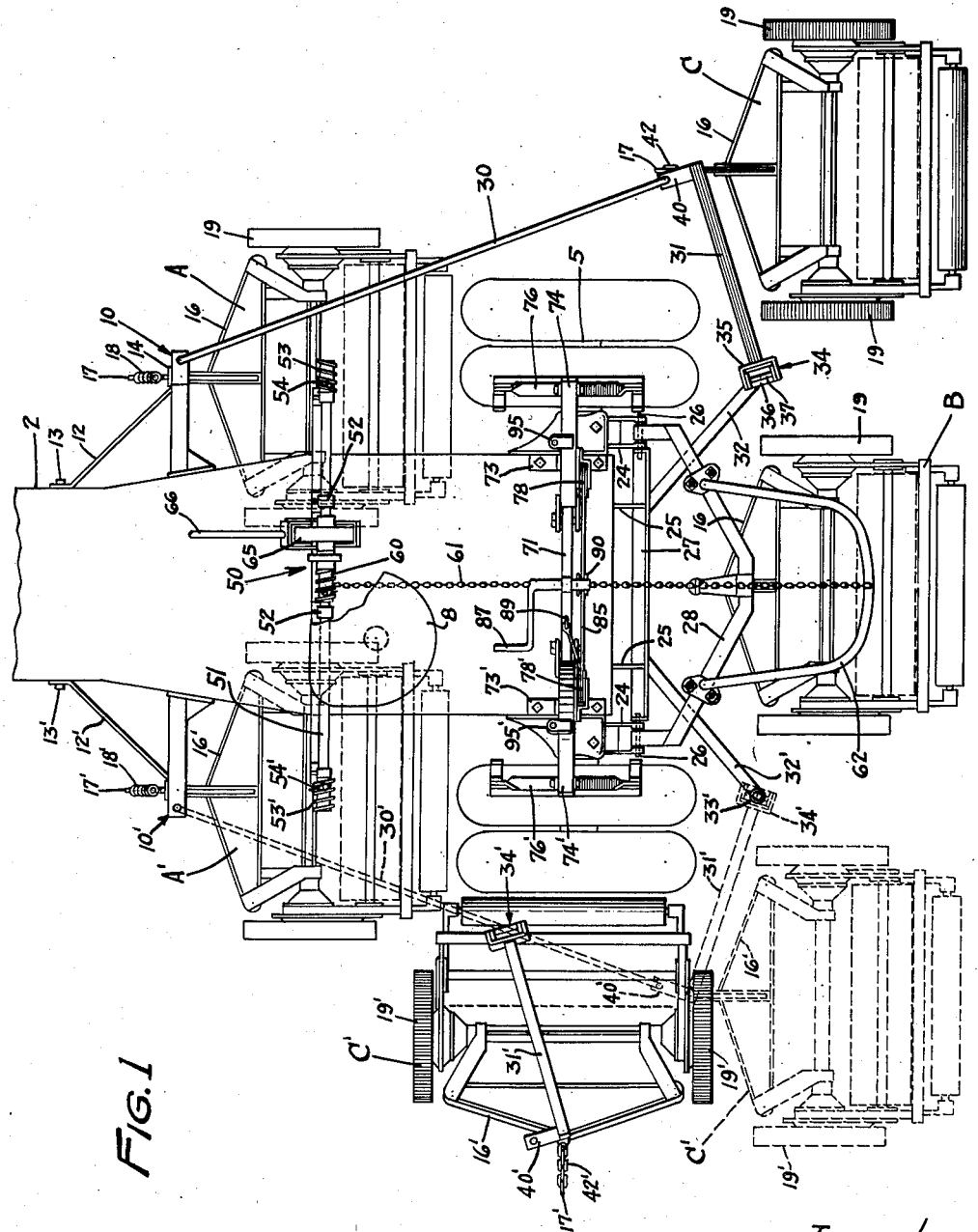

The multiple unit mowing machine of the present invention comprises a traction vehicle upon which is mounted a plurality of mower units and an apparatus for elevating the units from the ground into a transporting position. The preferred form of the invention illustrated in the drawings comprises a traction vehicle generally designated 1, having a chassis frame 2, a motor 3, forward steering axle and wheel assembly 4 and a rear driving axle and wheel assembly 5. The traction vehicle also includes a steering wheel 6, operating levers 7 and a driver's seat 8. The traction unit and its component parts are preferably of the automotive type and may be varied to suit the conditions of the service of the mower.

The mowing units, per se, form no part of the present invention and may be of any desired type. They are preferably identical although some variation in size is permissible.

Figure 1 illustrates the manner in which a plurality of mowing units are grouped about the traction unit. As shown in this figure, units A and A' are arranged in laterally spaced relationship forwardly of the rear axle 5; unit B is arranged centrally to the rear of the driving axle 5 of the traction vehicle, and units C and C' when in mowing position, are arranged to the rear of the traction unit on a line with unit B and laterally spaced from the vehicle. Each of the mowing units slightly overlaps the cutting path of another unit so that by their combined action they mow a wide swath which is equal to the sum of the cutting widths of all of the units, less the amount of overlapping of the cutting paths. The illustrated arrangement of the cutting units permits adequate clearance for each unit to swing, during turning of the vehicle, and adequate vertical movement to permit the units to follow irregularities in the surface of the turf. While the arrangement illustrated is preferred, other arrangements may be used.

The traction linkage between units A and A' and vehicle 1 consist of a bracket generally designated 10 which is bolted to the chassis frame 2 by means of bolts 11. The bracket 10 is provided with a brace 12 which is bolted to the frame 2 at 13 and to a depending arm 14 of the bracket. The depending arm 14 is provided with a universal connection such as one portion of a ball and socket joint 15, the other portion of which is carried by drawbar 16 of the mowing unit.

The forward end of the drawbar 16 extends to a position ahead of the depending bracket 14 and is provided with a hook 17 to which spring 18 is attached. The spring 18 is attached at its upper end to depending arm 14 and exerts an upward force on the hook 17 and hence tends to force the rear portion of drawbar 16 downwardly. This effect enhances the pressure of drive wheels 19 of the mowing unit upon the surface on which they are operating, as disclosed in U. S. patent, Serial Number 503,719, now Patent 1,900,726, issued March 7, 1933.

The side frames 2 of the vehicle chassis carry perches 21 which rest upon the housing 22 of the driving axle assembly 5 as shown in Figure 1. The perches 21 are held in assembled relation on the axle housing by means of bolts which extend through the perches to bottom plates 23. Each of the perch assemblies also carries a pair of bracket arms 24.

The rear axle housing 22 also carries a pair of rearwardly extending brackets 25 to which a cross-bar 27 is attached. The cross-bar is fixed with respect to the axle housing and carries a pair of tow-bars 32 and 32'.

The brackets 24 curve upwardly as shown in Figure 4 and are equipped with pivot bolts 26 which carry a V-shaped tow-frame assembly 28. The tow-frame 28 is shaped so as to clear tow-bars 32 and 32' and is provided with a downwardly extending arm 29 to which mowing unit B is attached by means of ball and socket joint 15 and drawbar 16.

The traction linkage 16 of unit B is identical with those of units A and A' except that a chain 42 is used in place of spring 18. Since the chain 42 is inextensible, the weight of frame assembly 28 is carried on the unit B, which is forced downwardly so as to increase the traction between drive wheels and the surface over which they operate, as described in U. S. Patent Serial Number 112,188, now Patent No. 2,100,910, issued November 30, 1937.

The traction linkages of mowing units C and C' are similar and hence only that of unit C will be described. This traction linkage consists of a draw-rod 30, which is hooked into a hole in the bracket 10 of unit A, and similarly coupled with a spacer arm 31. The spacer arm 31 is universally mounted on the rear end of tow-bar 32 by means of a separable universal joint generally designated 34. As previously stated tow-arm 32 is fixed with respect to the rear axle assembly, being carried by brackets 25—25 and cross-bar 27.

The universal coupling joint 34 between the tow-bar 32 and spacer arm 31 is illustrated in Figure 1 and consists of a clevis 35 which is formed integrally with arm 31, and a second clevis 36 which is pivotally connected to the clevis 35 by means of pin 37. The clevis 36 is provided with a stub shaft 38 which fits into a vertical tubular bearing 33 which is formed integrally with arm 32. The spacer arm 31 is thus enabled to pivot in a vertical plane about pin 37 as a center, and is permitted to swing in a horizontal plane about the stub shaft 38 when rod 30 is disconnected.

The outer end of spacer arm 31 is provided with an integrally formed ear 40 to which the rod 30 is connected, and with a vertical bracket 41 (see Figure 2). Mower unit C is connected to the traction linkage composed of draw-rod 30, spacer arm 31, and tow-bar 32 by means of a ball and socket joint 15, between draw-bar 16 of unit C and bracket 41 of arm 31.

The forward end of traction arm 16 of unit C is provided with a hook 17, as with units A and B, but in this instance, as in the instance of unit B, a chain 42 joins the hook 17 and hook 43 on bracket 41 (see Figure 2). In a similar manner, the weight of rod 30 and spacer arm 31 is applied to increase the traction of unit C.

During the movement of the mowing machine from one area to another, the mowing units are elevated out of contact with the ground surface. The hoisting elements for units A and A' and B comprises a winch and chain assembly generally designated 50, as described in co-pending application, Serial Number 676,086, which illustrates a multiple axle tractor type mowing machine in which spaced mowers are suspended between the front and rear axles of the traction vehicle and provided with hoisting mechanisms for elevating the mowers during transportation. This assembly consists of a transverse shaft 51 which is journaled in brackets 52 mounted on the vehicle chassis 2. The shaft 51 overhangs the sides of the chassis and is provided at its ends with spiral wrapping grooves 53 and 53' which receive hoisting chains 54—54' for units A and A', respectively. The hoisting chains are permanently attached to their respective units by any suitable hitch.

Near the center of shaft 51 there is provided a third wrapping groove 60 for chain 61 which extends rearwardly over a U-shaped boom 62 by way of coupling 63 to mowing unit B. The boom 62 is fixed with respect to V-frame 28, and both swing as a unit about pin 26.

The cross-shaft 51 is provided with a hand operated mechanism of any suitable kind, generally designated 65, by which the shaft may be rotated.

Mechanism 65 includes a handle 66 by which the operator of the vehicle may operate it, and a release pedal 67 for controlling the lowering operation.

Figure 3:
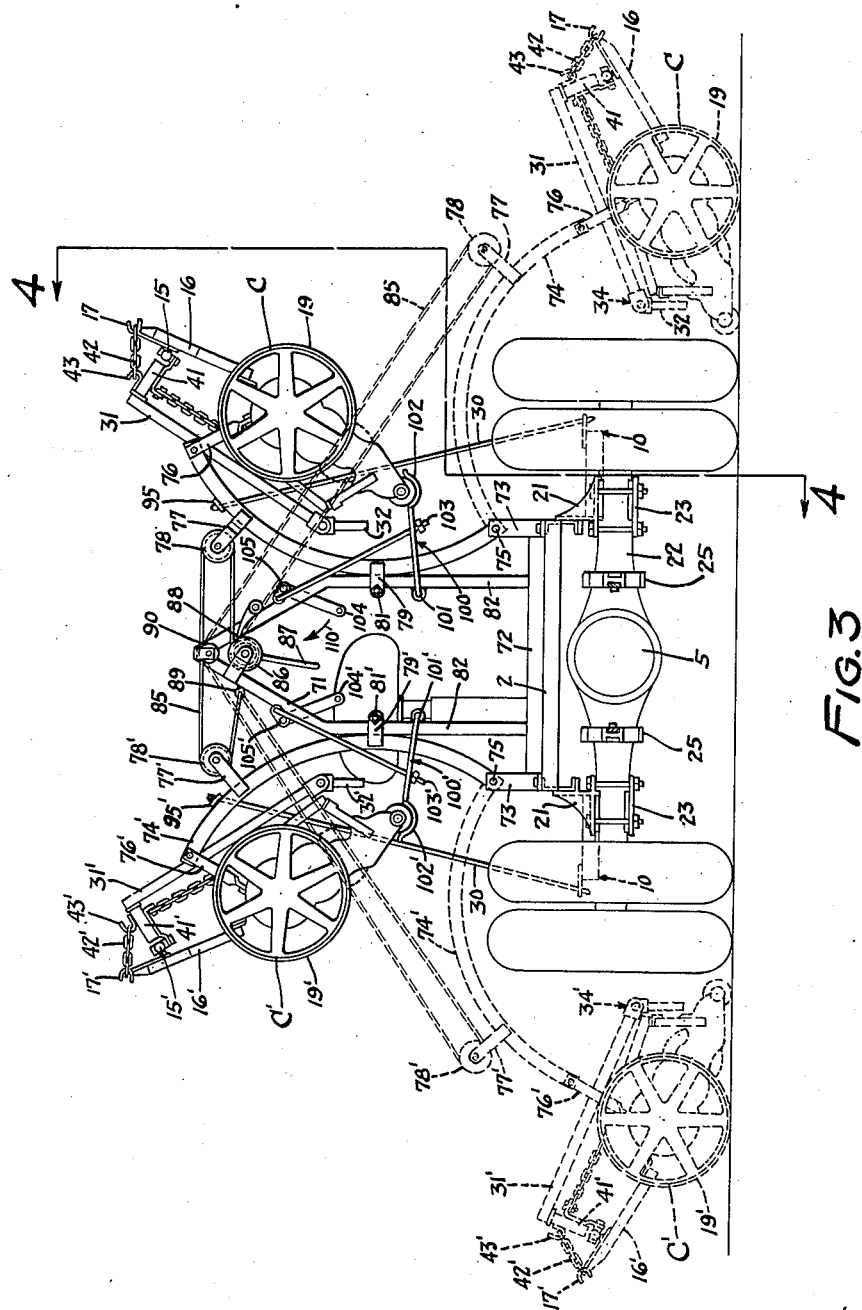
Figure 3 is a rear view of the machine, with several of the mowing units omitted, illustrating the hoisting of other units.

The hoisting mechanism for units C and C' is a crane mechanism generally designated 70, shown in detail in Figure 5 and in the general assembly of Figure 3. The mechanism comprises an inverted V-shaped frame 71 which is attached to the vehicle chassis by means of cross frame 72 and brackets 73 and 73' and two curved crane arms 74 and 74' which are pivotally mounted on bolts 75 and 75' for movement in a vertical plane transversely of the vehicle. Crane arms 74 and 74' which serve units C and C' are similar, and are provided at their upper ends with pivotally mounted grab hooks 76 and 76', respectively. The crane arms are provided with brackets 77 and 77' and pulleys 78 and 78' and with a lock coupling generally designated 79.

Coupling 79 is shown in detail in Figure 6 and consists of a pair of short side plates 80 which are fixed upon the crane arms 74 and 74'. The side plates 80 are apertured and curved apart near their ends and are sufficiently long to permit a pin 81 to be passed through the aperture when the arms are in a position embracing the vertical section 82 of main frame 71. When the arm is in the position shown in Figure 6 with the pin 81 passing through the apertures in the arm, it is locked against any outward movement but the pin 81 can readily be withdrawn to permit movement.

The hoisting arrangement by which arms 74 and 74' may be raised and lowered consists of a cable 85 and winding drum 86 which are arranged to be operated by hand crank 87. The winding drum 86 is provided with a pawl and ratchet mechanism 88 by which the winding drum 86 may be locked against reverse movement. The cable 85 is attached to main frame 71 by eye bolt 89 and thence passes over pulley 78' of crane arm 74' and over a small pulley 90 at the upper extremity of the main frame 71. The cable then passes over pulley 78 of crane arm 74 and finally to winding drum 86. Thus as winding drum 86 is turned so as to take in the cable 85, crane arm 74 may be elevated from the position shown in the dotted lines in Figure 3 to the full line position shown in Figure 3.

Crane arms 74 and 74' are also provided with integrally formed sockets 95 and 95', respectively, which receive hooks formed on draw-rods 30 and 30' when the arms and mowing units are in elevated position as shown in the dotted lines in Figure 2. In these positions the draw-rods 30 and 31 serve to brace the hoisting mechanism 70, and particularly the crane arms 74 and 74' during the time the mowing units C and C' are being transported thereon.

When the mowing units C and C' are in their elevated position additional support is provided to each moving unit by a wiper roll supporting arm, generally designated 100 and 100'. These are the same for both units and hence only that for unit C will be described in detail.

Arm 100 is V-shaped and is pivoted at point 101 upon main frame 71 of the hoist. The outer ends of the arm are provided with shaped, semicircular supports 102 to receive the wiper rolls of the mowing machines. The arms 100 are elevated by lifting links 103 which are drawn upwardly by the action of a hand lever 104 which is pivoted at 105 to the main frame 71 of the hoisting mechanism. The hand lever 104 is movable in the direction of the arrow 110 from the position shown in Figure 3 to the position shown in Figure 5 to lower the supports. In the position shown in Figure 3 the pivotal connection between lifting links 103 and the arm 104 is closer to the main frame 71 than pivot point 105, and the support 102 is accordingly locked in the wiper roll gripping position.

*Operation*

When the mowing units are to be elevated from the ground to the transporting position, hand lever 66 of mechanism 65 may first be oscillated, and chains 54—54' and 61 which serve units A, A' and B, respectively, are all wound upon their respective winding grooves on transverse shaft 51. As the chains 54 and 54' are wound, units A and A' are lifted directly about the universal connections 15 as a pivot, until the units are from six to eight inches above their respective mowing positions. As chain 61 is wound upon shaft 51 the boom 62 and V-frame 28 are raised about pivot bolts 26 until the slack in the chain and hitch 63 is removed. The boom 62, hitch 63, mowing unit B, its traction connection 16, and V-frame 28 are then moved as a unit about pivot pins 26—26 until the unit B is raised into transporting position about six or eight inches above its mowing position.

To move units C and C' from mowing position into position for hoisting, rods 30 and 30' are first disengaged. The universal connections 34 and 34' are then disconnected from tow-bars 32 and 32' simply by lifting stub shafts 38 of each joint out of bearing 33. Arms 31 and 31' are rotated backwardly so as to overlie their respective units, and the units are then rolled to the position adjacent the rear wheels, as shown by the full line position of unit C' in Figure 1. The hoisting mechanism for units C and C' is then lowered to the dotted line position shown in Figure 3 and grab hooks 76 and 76' are coupled to units C and C', respectively. Hand crank 87 is then operated in a direction to wind cable 85 upon winding drum 86 and the arms 74 and then 74' are accordingly raised to the full line position shown in Figure 3. In so doing units C and C' are elevated. Ratchet 88 prevents the unwinding of drums 86, but for additional safety, pins 81 are inserted and the crane arms 74 are accordingly locked in elevated position. Handles 104 and 104' which up to this time were in the position shown in Figure 5, are moved downwardly to the position shown in Figure 3, and in so doing arms 100 and 100' are drawn upwardly until the curved ends 102 of the arms are in tight contact with the wiper rolls of mowing units C and C', respectively. When in this position the units are steadied against oscillation during transit.

By referring to Figure 1 it will be seen that three of the five moving units illustrated are to the rear of driving axle 5 while mowing. When the units are elevated into transporting position, only unit B is behind the driving axle 5. Units A and A' remain in substantially the same position with respect to vehicle 1 in both the mowing and transporting positions, and units C and C' are poised substantially over the driving axle 5. The center of gravity of all of the mowing units taken together is, therefore, ahead of the driving axle 5, and since the center of gravity of the traction vehicle by itself is between the driving axle 5 and the steering axle 4, it follows that when the mowing units are in the transporting position the center of gravity of the vehicle and load combined, is ahead of the driving axle 5. There is accordingly no tendency for the guiding wheels 4 ever to be pulled off or to ride too lightly upon the ground even while the vehicle is accelerating rapidly in traffic or ascending a steep grade.

Variations in the position of hoisting mechanism 70 may obviously be made, so long as the center of gravity of the mowing unit load is over or ahead of the driving axle 5 when in the transporting position.

It will also be noted that the hoisting of units C and C' is along a transverse line of the vehicle, adjacent the rear axle. The lateral moment which occurs during hoisting is accordingly resisted by the long unyielding rear axle assembly. The fact that units C and C' are hoisted in opposition even though one may be elevated before the other, also serves to steady the vehicle during the hoisting operation.

An added means for utilizing the traction linkage described for units C and C' occurs when it is desired to move the mowing machine, without elevating the units, through a space of limited width. This is accomplished by disconnecting rods 30 and 30', and permitting arms 31 and 31', with respective units C and C', to swing backward about bearings 33 and to trail therebehind, as described in U. S. Patent Number 2,067,158. The over all width of the gang of five units is thereby reduced to the width of a gang of three units.

Variations may obviously be made in the mechanism without departing from the spirit of the invention described and claimed herein.

I claim:

1. A multiple unit mowing machine comprising a traction vehicle having a driving axle, drive wheels mounted thereon, a plurality of mowing units mounted in mowing position on said vehicle, and hoist mechanism extending transversely over said vehicle drive wheels for lifting said units.

2. In a mowing machine a traction vehicle having front and rear wheels; a crane arm pivotally mounted on said vehicle for movement from an upright position to a substantially horizontal position across said rear wheel, a mowing unit and means for maintaining said unit in a position spaced laterally from the axis of the vehicle beyond the path of said wheels, means for connecting said unit to said crane arm and means for elevating said arm to thereby elevate the mowing unit into a carrying position with the crane arm upright, and a second arm pivoted on said vehicle, said second arm being shaped to engage a part of said unit when the latter is elevated, and means for moving the second arm into engagement with said unit.

3. A multiple mowing unit transport mowing machine comprising a traction vehicle having a front axle and a rear axle, a mowing unit connected to the vehicle and having a normal position forwardly of the rear axle, means for elevating said forwardly positioned unit during transporting, another mowing unit normally positioned rearwardly and laterally with respect to the vehicle rear axle, hoisting means mounted on the chassis and means connecting the rearwardly positioned unit with the hoisting means, said connecting means having movement from an operative mower position to a position over the chassis and sufficiently forwardly of the normal position of the unit that when the units are elevated into their transporting positions the center of gravity of the vehicle and hoisted units will be between the vehicle axles.

4. A device of the type set forth in claim 3, wherein the hoisting means is a crane arm.

5. A device of the type set forth in claim 3 wherein there is means on the vehicle and engaging the rear unit when in its hoisted position for holding the unit against swaying movement.

6. A multiple mowing unit transport mowing machine comprising a traction vehicle having a chassis, a front axle and wheels and a rear axle and wheels, mowing units connected to the vehicle and normally positioned one forwardly of each rear wheel, means for hoisting said units during transportation; other mowing units positioned rearwardly and outwardly of each rear wheel in overlapping cutting relation with respect to the first mentioned units and hoisting means mounted on the vehicle there being one for each rearwardly positioned unit, means connecting each of the rearwardly positioned units with its hoisting means, each of said connecting means having movement from an operative rear mower position to a position over the chassis sufficiently forwardly that when all of the units are in transporting condition the center of gravity of the units and chassis will be between the vehicle axles.

7. A device of the type set forth in claim 6 wherein the hoisting means comprises crane arms one for each mowing unit and means for operating the arms simultaneously to elevate the units.

JOHN S. CLAPPER.